(12) United States Patent
Foggy

(10) Patent No.: US 8,292,559 B1
(45) Date of Patent: Oct. 23, 2012

(54) CARGO SECUREMENT DEVICE FOR A UTILITY VEHICLE

(76) Inventor: Bruce Edward Foggy, Sacramento, CA (US)

( * ) Notice: Subject to any disclaimer, the term of this patent is extended or adjusted under 35 U.S.C. 154(b) by 0 days.

(21) Appl. No.: 13/072,014

(22) Filed: Mar. 25, 2011

Related U.S. Application Data

(60) Provisional application No. 61/318,302, filed on Mar. 27, 2010.

(51) Int. Cl.
*B61D 45/00* (2006.01)
(52) U.S. Cl. .......................................................... 410/96
(58) Field of Classification Search .................... 410/96, 410/97, 117, 118; 296/100.16
See application file for complete search history.

(56) References Cited

U.S. PATENT DOCUMENTS

| | | | | |
|---|---|---|---|---|
| 4,885,925 A | * | 12/1989 | Place et al. | 72/292 |
| 5,193,955 A | * | 3/1993 | Chou | 410/100 |
| 5,458,447 A | * | 10/1995 | Clason | 410/100 |
| 5,469,813 A | * | 11/1995 | Peden | 119/770 |
| 6,068,085 A | * | 5/2000 | Denny et al. | 182/138 |
| 6,152,664 A | * | 11/2000 | Dew et al. | 410/100 |
| 6,419,433 B1 | * | 7/2002 | Chou | 410/97 |
| 6,439,815 B1 | * | 8/2002 | Liu | 410/106 |
| 6,474,022 B1 | * | 11/2002 | Double et al. | 52/3 |
| 6,783,312 B2 | * | 8/2004 | Smith | 410/97 |
| 6,851,903 B1 | | 2/2005 | Foggy | |
| 7,448,836 B2 | * | 11/2008 | Clarke et al. | 410/97 |
| 2009/0095232 A1 | * | 4/2009 | McKay | 119/770 |
| 2009/0192423 A1 | * | 7/2009 | Halmos | 601/134 |

* cited by examiner

*Primary Examiner* — H Gutman
(74) *Attorney, Agent, or Firm* — John P. Costello; Costello Law Corp.

(57) ABSTRACT

An inventive cargo securement device as described herein integrates a mesh tarp portion with a cargo net portion. In the preferred embodiment, the mesh tarp portion is overlaid upon the cargo net portion to create a substantially smooth, and snag-free side to the device, which allows for easier maneuvering over cargo loads without snagging. The side opposite the smooth side is a lattice work of longitudinal and latitudinal straps overlaid upon the mesh tarp portion and is attached thereto. In use, the lattice work side of the device preferably does not contact the cargo, but provides a foundation for attaching a plurality of anchor points located within the perimeter of the mesh tarp portion. By locating anchor points within the perimeter of the mesh tarp portion, ropes, hooks, winches or a combination thereof can be attached to the anchor points and any slack in the mesh tarp portion can be effectively gathered up. By removing as much slack as possible, this insures that the maximum amount of contacting surface of the device will be applied against a cargo load.

15 Claims, 2 Drawing Sheets

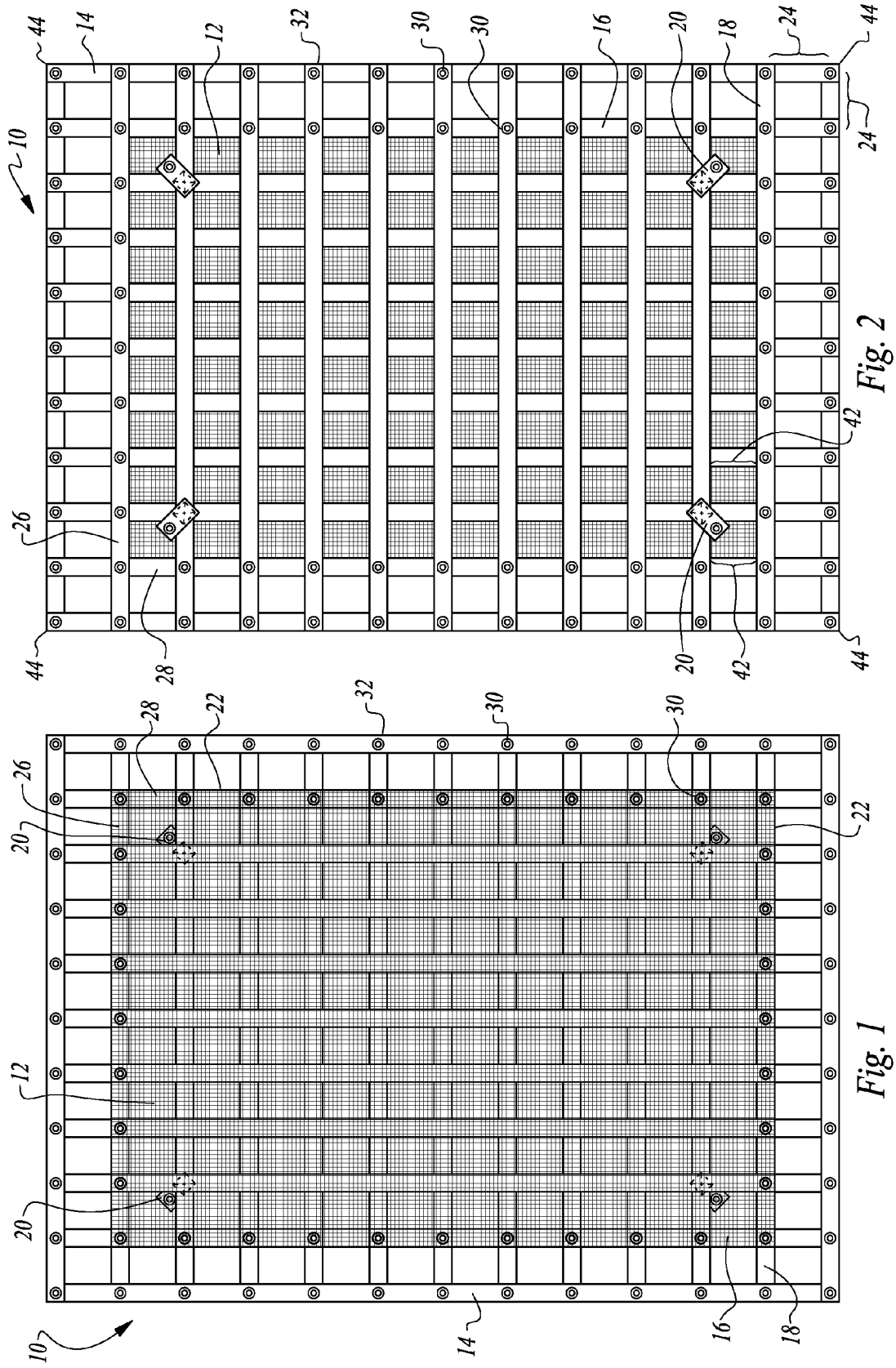

CARGO SECUREMENT DEVICE FOR A UTILITY VEHICLE

RELATED APPLICATIONS

This utility patent application claims the benefit of U.S. Provisional Ser. No. 61/318,302, filed on Mar. 27, 2010.

TECHNICAL FIELD

This invention relates to tarps and netting for securing and containing a load of cargo in a utility vehicle, and more specifically, to a cargo securement device which integrates a mesh tarp with a lattice-type cargo net.

BACKGROUND

The need to tie down and secure cargo vehicle loads has been an ongoing need. With particular attention to small pickup loads, a number of tie-down and securement methods have been devised. Common methods include using rope or even bungee cord devices which are prone to tangling, thus creating a source of aggravation for a user. Other methods involve using plastic or canvas tarps which habitually flap in the wind and tear due to the fact that they capture air rather than letting it pass through as the vehicle travels.

U.S. Pat. No. 6,851,903, issued to the present inventor, Bruce Edward Foggy, represents a better and more practical solution to securing loads in small pickups than the aforementioned ropes, bungee cords and plastic tarps. This invention comprises a mesh center wherein the borders of the mesh are attached to a lattice work of heavy straps. This solution works well, however, it fails to provide, anchor points within the confines of the mesh center, thus hampering securement to smaller loads or tall and narrow loads, like a refrigerator. Also, the large area comprising the lattice work of straps has a tendency to snag on loads and requires multiple adjustments of this device to center it properly on a load.

The present invention solves the shortcomings of the previously mentioned solutions to vehicle load securement and provides an advancement in the art of securing small vehicle loads which has not gone unnoticed by the public.

The foregoing reflects the state of the art of which the inventor is aware, and is tendered with a view toward discharging the inventor's acknowledged duty of candor, which may be pertinent to the patentability of the present invention. It is respectfully stipulated, however, that the foregoing discussion does not teach or render obvious, singly or when considered in combination, the inventor's claimed invention.

SUMMARY OF THE INVENTION

The invention is an integrated tarp and cargo net securement device having enhanced securement features. This integrated securement device adopts the strength enhancing feature of a lattice work cargo net with the load covering benefits of a mesh tarp. The lattice work cargo net is formed from a plurality of longitudinal straps joined to a plurality of latitudinal straps. The dimensions of the cargo net portion are preferably sized appropriately to the typical cargo area of a small utility vehicle. For example, the cargo net may have different dimensions for a long-bed pickup application when compared to a cargo net dimension for the short cargo box of a Jeep®.

The mesh tarp portion is comprised of rip-stop mesh screen which is centered on the cargo net portion and is attached directly over one side of the cargo net portion. The result of attaching the mesh tarp portion to a one side of the cargo net portion is to create a device having a smooth side which serves as a cargo-contacting surface and an opposite side having a lattice work surface of crossed straps, which add further structural integrity to the rip-stop mesh screen. The smooth screen side is preferably born against a cargo load in a typical securement situation, thus allowing the device to be easily maneuvered over a cargo load and adjusted without snagging any open lattice work.

In the preferred embodiment, a row of open lattice work around the edges of the device remains uncovered by the mesh tarp portion, thus exposing the lattice work for purposes of attaching ropes or other securement means. On the lattice work side of the device are provided further attachment means located within the perimeter defined by the mesh tarp portion to allow attachment of securing hooks, ropes or winches. This allows slack to be gathered up in the mesh tarp portion, which aids in providing significant draw-down force against a load, as will be further described herein.

Accordingly, the following objects and advantages of the invention apply:

It is an object of this invention to provide a cargo securement device which can be easily maneuvered over a cargo load without snagging.

It is another object of this invention to provide a cargo securement device which has improved securement features for drawing down on a cargo load.

Still another object of this invention is to provide a cargo securement device which can provide holding capacity for a diverse size range of loads.

Still another object of this invention is to provide a cargo securement device having the ability to add further tie-down straps to many anchor points, thereby increasing the load capacity which can be hauled.

Still another object of this invention is to provide a cargo securement device having the ability to link devices together so that a larger tie-down surface can be achieved.

A further object of the invention is to provide a cargo securement device having utility for securing tall, narrow loads, such as a refrigerator.

Further objects and advantages of the invention will be brought out in the following portions of the specification, wherein the detailed description is for the purpose of fully disclosing the preferred embodiments of the invention, without placing limitations thereon.

BRIEF DESCRIPTION OF THE DRAWINGS

The invention will be more fully understood by reference to the following drawings which are for illustrative purposes only:

FIG. 1 is a side view of the inventive securement device illustrating the side of the device having the mesh tarp portion overlaying the lattice work of the cargo net portion.

FIG. 2 is an opposite side view of the securement device of FIG. 1 illustrating the side of the device having the cargo net portion overlaying the mesh tarp portion.

DETAILED DESCRIPTION OF THE PREFERRED EMBODIMENTS

Figure 3:
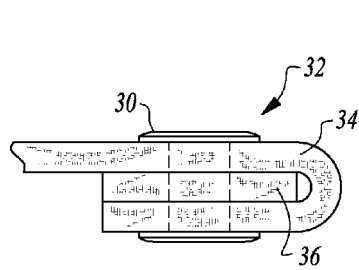
FIG. 3 is a close-up view of the ends of the cargo net portion showing their triple-layered reinforcement feature.

Referring to FIG. 1, the inventive cargo securement device 10 as described herein integrates a mesh tarp portion 12 with a cargo net portion 14. In the preferred embodiment, the mesh tarp portion 12 is overlaid upon the cargo net portion 14 to create a substantially smooth, and snag-free side to the device, which allows for easier maneuvering over cargo loads without snagging. The opposite side of the device, shown in FIG. 2, comprises a lattice work of longitudinal and latitudinal straps 16, 18 overlaid upon the mesh tarp portion 12 and is attached thereto, by sewing, for example. In use, the lattice work side of the device preferably does not contact the cargo, but provides a foundation for attaching a plurality of anchor points 20 located within the perimeter 22 of the mesh tarp portion 12. As shown the perimeter of cargo net portion 14 extends beyond the perimeter of mesh tarp portion 12. By locating anchor points 20 within the perimeter 22 of the mesh tarp portion 12, ropes, straps, hooks, winches or a combination thereof can be attached to anchor points 20 and any slack in the mesh tarp portion 12 can be effectively gathered up. By removing as much slack as possible, this insures that the maximum amount of contacting surface of the device 10 will be applied against a cargo load. Also draw-down force applied to anchor points 20, allow for efficient securement of tall, narrow loads such as refrigerators.

In the preferred embodiment, the cargo net portion 14 exceeds the perimeter 22 of the mesh tarp portion 12, leaving a single row of lattice webbing 24 uncovered by the mesh tarp portion 12. The shape of the tarp is a four-sided square or rectangle as shown in the drawings, because most cargo spaces in utility vehicles are similarly shaped; however it is within the scope of the invention that the inventive securement device 10 can adopt other shapes such as circular, oblong, triangular or trapezoidal to adapt to odd-shaped cargo spaces.

The row 24 of exposed lattice webbing is useful for securing ropes, straps, hooks and winches to; it also allows a user to reach through the device, along its edge, and adjust a portion of a cargo load, if desired. As shown in the figures, the four side edges of the mesh tarp portion 12 comprise its perimeter 22, with two sides aligning with latitudinal straps 18, 26 and two sides aligning with longitudinal straps 16, 28. Straps 16, 18, 26, 28 extend into the perimeter boundary 22 of the mesh tarp portion 12 and the perimeter edges of the mesh tarp portion 12 are folded in a hem and stitched to the straps 16, 18, 26, 28 of the cargo net and are further secured by grommets 30.

Referring to FIG. 3, a close-up view of the ends 32 of net portion 14 where the longitudinal and latitudinal straps terminate is shown. Ends 32 of the device 10 are triple layered. In this view the end of a latitudinal strap 34 is surrounded top and bottom by the end of a longitudinal strap 36, thus forming three layers. The straps are stitched together and further secured by grommets 30. The corners 44 are preferably four-layered, in similar fashion, by overlapping the longitudinal strap and overlapping the latitudinal strap and securing with a grommet. Grommets 30 provide anchor points along the edge of the device 10 and occupy locations on the net portion 14 that are substantially even with or exterior to the perimeter of the tarp portion 12.

Figure 4:
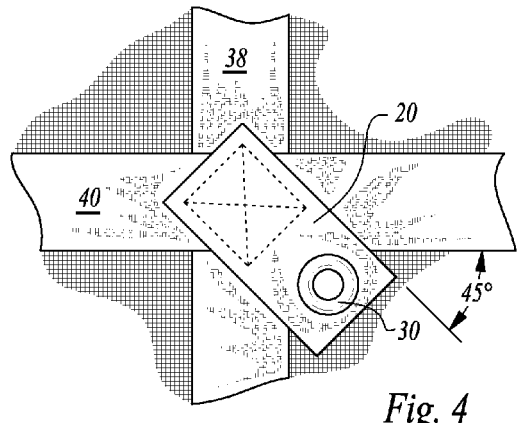
FIG. 4 is a close-up view of the enhanced securement feature of the device.

Now referring to FIG. 4, a close-up of the enhanced securement capability of the device 10 can be described. Often cargo tarps and the like are provided with anchor points at their corners, such as through-hole grommets. However, this type of securement often does not properly gather up the slack in the center of the tarp, or else gathers it up in an uneven manner, leaving some sides looser than others. With the invention, it has been found that providing anchor points 20 at locations within the area occupied by the mesh tarp portion 12 allows for the slack in the mesh tarp 12 to be gathered up in an even manner and tightened considerably. Anchor points 20 are stitched securely on the cargo net side 14 to a junction formed by the crossing of the longitudinal and latitudinal straps 38, 40; this junction being located inside the perimeter 22 of the mesh tarp portion 12. As shown, anchor point 20 is secured a distance of one lattice square inward 42 from the perimeter edge 22 of the tarp portion 12. Anchor point 20 is preferably set at a 45-degree angle so that when a securing line (e.g. a rope, strap, hook or winch) is attached to the grommet 30 in anchor point 20, the securing force will be applied in a direction toward the corner 44 of the device 10 and also toward the securement points 52 at the corners of a pickup bed. Anchor points 20 also provide a draw down location for better securement of tall, narrow loads, such as refrigerators.

Both the mesh tarp portion 12 and the cargo net portion 14 are made of highly resistant material which limits the destructive effects of outdoor elements such as sun, rain, heat, cold, dirt and automotive exhaust fumes. In a preferred embodiment of the invention, the mesh tarp fabric and cargo net webbing are made of polypropylene, nylon, or polyester vinyl-coated fabric. Also, the mesh screen material of mesh tarp portion is preferably of a rip-stop type with a mesh density sufficient to allow air to pass freely though the device and not be inordinately captured such that flapping of the device occurs during high-speed driving.

Figure 5:
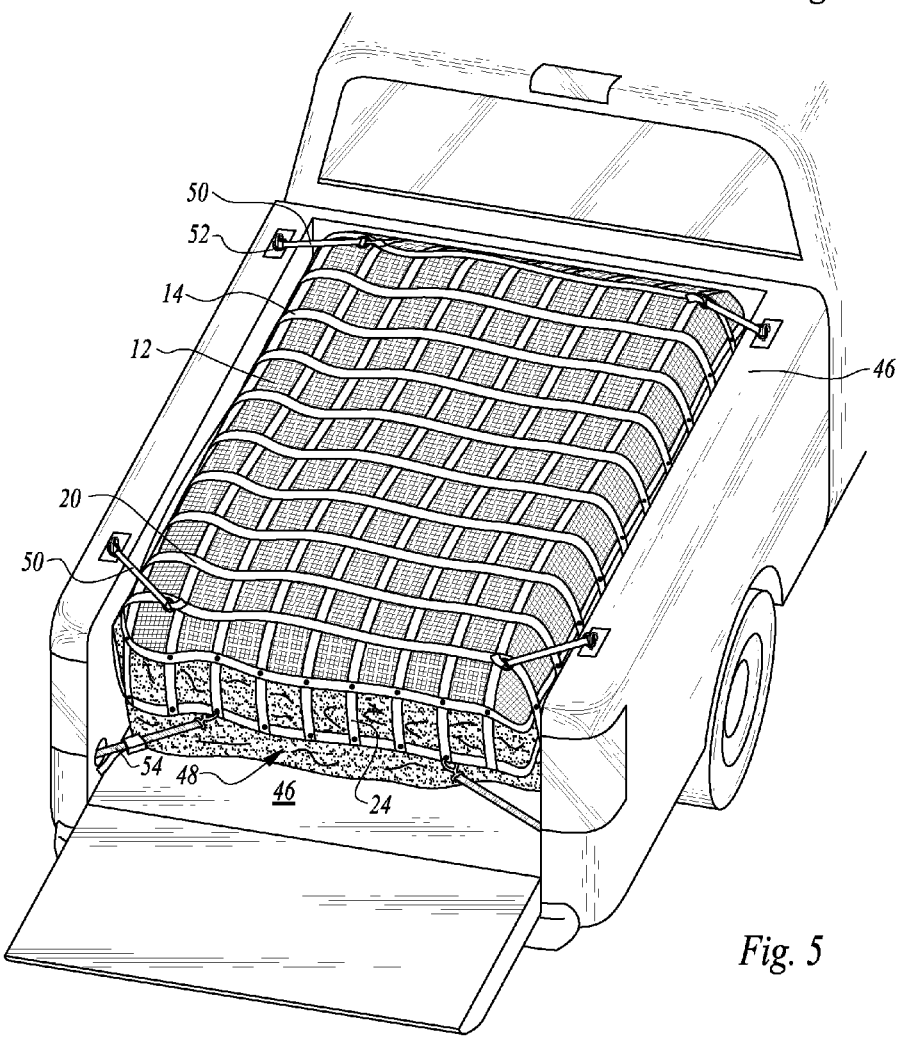
FIG. 5 is a rear perspective view of the inventive device securing a cargo load in a pickup bed, wherein the pickup tailgate is lowered so that the securing lines attached to the device can be seen.

FIG. 5 shows the device as it would be used during the securement of a cargo load located in a pickup truck bed 46. As shown, the mesh tarp portion 12 side is laid on the cargo load 48 in a contacting manner and centered on the load. The side comprising the cargo net webbing 14 faces upward. Anchor points 20 receive a securing strap 50 and are pulled and tied tightly to securement points 52. Next, the exterior webbing portion 24 is pulled downward and secured with securing straps 54 to any convenient securement points located in the pickup bed 46. The downward force applied against the cargo load by the device holds it securely within the pickup bed. Also one added feature of the invention is the ability to connect a plurality of the devices together to provide coverage for larger loads. The securement devices can be connected together by bolting separate devices through grommets 30 or through connecting straps to anchor points 20 on separate devices.

Finally, although the description above contains much specificity, this should not be construed as limiting the scope of the invention, but as merely providing illustrations of some of the presently preferred embodiments of this invention. This invention may be altered and rearranged in numerous ways by one skilled in the art without departing from the coverage of any patent claims, which are supported by this specification.

The invention claimed is:

1. A cargo securement device, comprising:
   a lattice-like cargo net portion comprised of a plurality of lattice squares formed from joining a plurality of longitudinal straps to a plurality of latitudinal straps, said cargo net portion defining a four-sided, four-cornered perimeter;
   a tarp portion comprised of a rip-stop mesh overlying a one side of said cargo net portion, said tarp portion providing said securement device with a first snag-resistant cargo contacting side attached to a second reinforced side comprised of said cargo net portion;

said four-sided perimeter of said cargo net portion extending a distance of one lattice square beyond a four-sided, four-cornered, perimeter of said tarp portion; and a plurality of first anchor points attached to said reinforced side, said anchor points located a distance of one lattice square inward from said perimeter of said tarp portion, each anchor point being in substantial 45-degree alignment with a corresponding corner of said cargo net portion.

2. The cargo securement device as recited in claim 1, further comprising a plurality of second anchor points located at a junction of said longitudinal and latitudinal straps, said anchor points being substantially even with or exterior to said perimeter of said tarp portion.

3. The second anchor points as recited in claim 2, further comprising grommets penetrating said longitudinal and latitudinal straps and providing a through-hole penetrating said straps.

4. A cargo securement device, comprising:

a lattice-like cargo net portion comprised of a plurality of lattice squares formed from joining a plurality of longitudinal straps to a plurality of latitudinal straps, said cargo net portion defining a four-sided, four-cornered, perimeter;

a tarp portion comprised of a rip-stop mesh overlying a one side of said cargo net portion, said tarp portion providing said securement device with a first snag-resistant cargo contacting side attached to a second reinforced side comprised of said cargo net portion; and a plurality of first anchor points attached to said reinforced side, each anchor point being in substantial 45-degree alignment with a corresponding corner of said cargo net portion.

5. The cargo securement device as recited in claim 4, further comprising a plurality of second anchor points located at a junction of said longitudinal and latitudinal straps said anchor points being substantially even with or exterior to said perimeter of said tarp portion.

6. The second anchor points as recited in claim 5, further comprising grommets penetrating said longitudinal and latitudinal straps and providing a through-hole penetrating said straps.

7. The cargo securement device as recited in claim 4, wherein said first anchor points are located on said cargo net portion a distance of one lattice square inward from said perimeter of said tarp portion.

8. A cargo securement device, comprising:

a lattice-like cargo net portion comprised of a plurality of lattice squares formed from joining a plurality of longitudinal straps to a plurality of latitudinal straps; and a tarp portion comprised of a mesh overlying a one side of said cargo net portion, said tarp portion providing said securement device with a first cargo contacting side attached to a second reinforced side comprised of said cargo net portion.

9. The cargo securement device as recited in claim 8, wherein said cargo net portion defines a plurality of lattice squares further defining a four-sided, four-cornered perimeter.

10. The cargo securement device as recited in claim 9, wherein said cargo net portion defines a perimeter which extends beyond a perimeter of said tarp portion.

11. The cargo securement device as recited in claim 10, further comprising a plurality of first anchor points attached to said reinforced side, each anchor point being in substantial 45-degree alignment with a corresponding corner of said cargo net portion.

12. The cargo securement device as recited in claim 11, wherein said first anchor points are located on said cargo net portion a distance of one lattice square inward from a perimeter of said tarp portion.

13. The cargo securement device as recited in claim 12, further comprising a plurality of second anchor points located at a junction of said longitudinal and latitudinal straps said anchor points being substantially even with or exterior to said perimeter of said tarp portion.

14. The second anchor points as recited in claim 13, further comprising grommets penetrating said longitudinal and latitudinal straps and providing a through-hole penetrating said straps.

15. The cargo securement device as recited in claim 8, wherein said cargo net portion defines a perimeter which extends beyond a perimeter of said tarp portion.

* * * * *